Nov. 22, 1927. 1,650,553
T. J. TRESIDDER
INSTRUMENT FOR MEASURING ANGLES
Filed Oct. 19, 1926
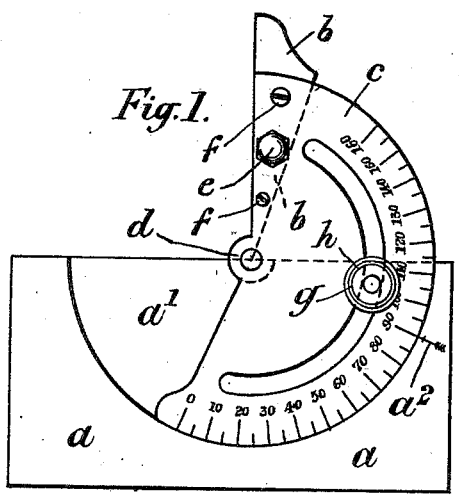
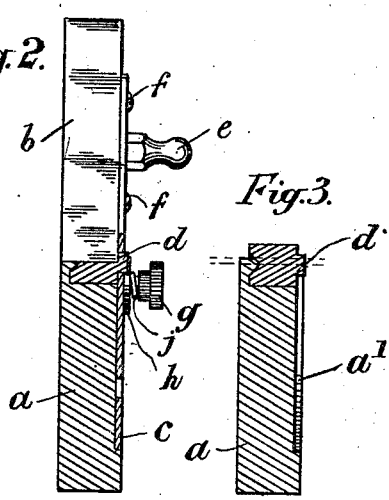
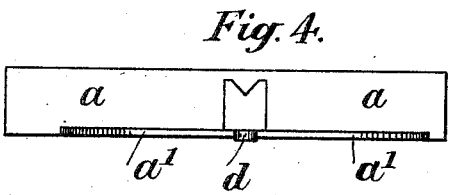
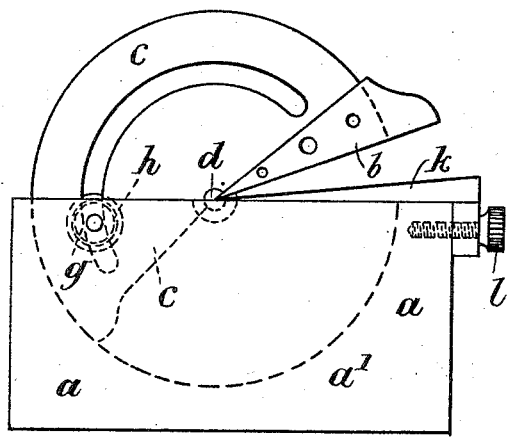
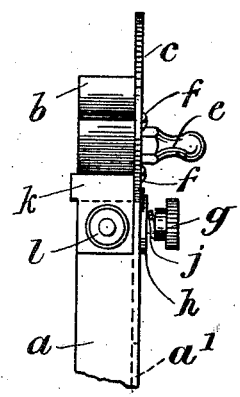
INVENTOR
TOLMIE JOHN TRESIDDER
BY HIS ATTORNEYS Patented Nov. 22, 1927.

1,650,553

UNITED STATES PATENT OFFICE.

TOLMIE JOHN TRESIDDER, OF UPPER NORWOOD, ENGLAND.

INSTRUMENT FOR MEASURING ANGLES.

Application filed October 19, 1926, Serial No. 142,672, and in Great Britain January 15, 1926.

For measuring angles, such as those of lathe centres, drills, or other tools, the choice of instrument has hitherto lain between (1) a fixed gauge, such as a notch in a plate, which is good for one angle only, or (2) a shifting gauge that can be set to any angle but has the great drawback that its two testing surfaces are not (loosely speaking) in the same plane; that is, one of the said surfaces is not opposite the other surface but is to the side thereof. The object of the present invention is to provide a shifting gauge that is free from this defect.

The manner in which this invention may be carried out is best described by reference to the accompanying drawing which illustrates a typical instrument capable of gauging any external, or internal, angle up to 160 degrees, and which can also be laid flat on a drawing board and used as a protractor.

Figure 1 is a front elevation of the complete instrument shewing it set to an angle of 90 degrees.

Figure 2 is a vertical cross-sectional elevation through the centre of the pivot.

Figure 3 is a vertical cross section of the body and pivot only, through the centre of the pivot, shewing the initial arrangement of the latter in the body according to one method of construction.

Figure 4 is a plan of the body as finished by machining its upper surface, pivot and all, down to the exact level of centre of pivot, so as to leave of the latter only the portion that is below that surface or projecting from the front of it.

Figure 5 is a rear elevation of the device shewing an attachment for facilitating the gauging of internal angles.

Figure 6 is an end elevation of this attachment and of the device.

The following are the four essential parts of the instrument.

(1) The body $a$, which in this case is a flat steel bar of rectangular section but may be made of other material or shape suited to the purpose. Its face is preferably countersunk, as shewn at $a^1$ to the depth of the thickness of the segmental piece $c$, so that the radial divisions thereon may be better read against an index line $a^2$ on the said body $a$.

(2) The wedge $b$, which may be of steel the same thickness as the thickness of the body $a$ below the counter-sunk part $a^1$ and may have its sides inclined to each other at 20 degrees. This wedge rotates on its apex which is in contact with the upper surface of the body $a$ and coincident with the axis of the pivot $d$, which also lies in that surface. During this rotation the apex of the wedge $b$ has no movement of translation, and the angle between the outer surface of the said wedge and the upper surface of the body $a$ can be varied from zero to 160 degrees and used for testing external angles within that range.

(3) The segmental piece $c$ which lies in the counter-sunk part $a^1$ of the body $a$, rotates on the pivot $d$, has a circular slot to allow of its being clamped to the said body in any position by a clamping screw $g$, and is fixed to the wedge $b$ in any convenient way, say by two studs or steady pins $f\ f$ and a set-screw $e$. This screw $e$ may conveniently be shaped to serve as a handle for varying the setting of the instrument, and it will be observed that when the wedge $b$ and the segmental piece $c$ are secured together the apex of the wedge $b$, being behind the standing part of the pivot $d$, keeps the said segmental piece $c$ in close contact with the body $a$ and does not permit their separation. The segmental piece $c$ is preferably made from a sheet of stiff material such as cast steel, german silver, phosphor-bronze, or the like. A suitable thickness for it in a gauge of the size illustrated, whose body $a$ is approximately 3⅝ inches by 1⅞ inches, is a full sixteenth of an inch. An index line $a^2$ against which angles are to be read, is scribed on the body $a$ as shown.

(4) The pivot $d$. This might be turned out of the material of the body $a$ when the countersink $a^1$ is being made, but a preferable method is to turn the pivot block separately from a rod of good cast steel, reducing the working part, or pivot proper, to approximately one eighth of an inch to three sixteenths of an inch in diameter for a length just exceeding the thickness of the segmental piece $c$ and making the rest of the block a little shorter than the thickness of the body below the countersunk part of the said body, and drilling a conical recess in its back end. The hole in the body $a$ to receive the pivot block is bored so as to leave a corresponding standing cone in its bottom. When the pivot block has been inserted into its hole it may be brazed or sweated therein so as to securely fix it and allow the part, shewn in Figure 3, projecting above the upper surface of the body *a* to be machined down to the level of the said upper surface as shewn in Figure 2.

The remaining portions of the device are the milled-headed screw *g* with its washer *h* and flat coiled spring *j*. These need no explanation.

For testing internal angles, such as a notch in template steel to form a fixed gauge, an additional attachment *k* (see Figures 5 and 6) that may be fixed to the body *a* in a moment with a single milled-headed screw *l*, can be provided. Its object is to allow one edge of the notch, brought into contact with the underside of the projecting edge of *k*, to be thereby made lineable with the upper surface of the body *a* by feel, leaving only one edge to be dealt with by the less accurate sense of sight. This attachment is not serviceable for angles under about 5 degrees, as the wedge *b* then comes into contact with it.

What I claim is:—

1. A shifting angle gauge comprising a body part, and a segmental piece carried by said body part, in combination with a pin to which said segmental piece is pivoted, said pin being secured to said body part at one of its surfaces, a portion of said pin being machined down to its axis which lies in the surface of said body part, and a wedge secured to said segmental piece, the apex of said wedge and the axis of said pin being coincident.

2. A shifting angle gauge comprising a body part, and a slotted segmental piece carried by said body part, in combination with a pin to which said segmental piece is pivoted, said pin being secured to said body part at one of its surfaces, a portion of said pin being machined down to its axis which lies in the surface of said body part, a wedge secured to said segmental piece, the apex of said wedge and the axis of said pin being coincident, and means for clamping the segmental piece to the body part, substantially as described.

3. A shifting angle gauge comprising a body part, having a countersunk portion in one of its faces, and a segmental piece carried in the countersunk portion of said body part, in combination with a pin to which said segmental piece is pivoted, said pin being secured to said body part at one of its surfaces, a portion of said pin being machined down to its axis which lies in the surface of said body part, and a wedge secured to said segmental piece, the apex of said wedge and the axis of said pin being coincident.

4. A shifting angle gauge comprising a body part having a countersunk portion in one of its faces, a segmental piece carried in the countersunk portion of said body part, radial markings adjacent the edge of said segmental piece, and an index marking upon said body part against which said radial markings may be read, in combination with a pin to which said segmental piece is pivoted, said pin being secured to said body part at one of its surfaces, a portion of said pin being machined down to its axis which lies in the surface of said body part, and a wedge secured to said segmental piece, the apex of said wedge and the axis of said pin being coincident.

5. A shifting angle gauge comprising a body part, and a circularly slotted segmental piece carried by said body part, in combination with a pin to which said segmental piece is pivoted secured to said body part at one of its surfaces, a portion of said pin being machined down to its axis which lies in the surface of said body part, in combination with a pin to which said segmental piece is pivoted, said pin being secured to said body part at one of its surfaces, a portion of said pin being machined down to its axis which lies in the surface of said body part, and a wedge secured to said segmental piece, the apex of said wedge and the axis of said pin being coincident, and a clamping screw passing through the circular slot in the segmental piece and screwing into the body part to clamp the segmental piece to the body part, substantially as described.

In testimony whereof I have signed my name to this specification.

TOLMIE JOHN TRESIDDER.